US012162158B2

(12) United States Patent
Yoneyama

(10) Patent No.: US 12,162,158 B2
(45) Date of Patent: Dec. 10, 2024

(54) ROBOT PROGRAMMING DEVICE

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 280 days.

(21) Appl. No.: 17/786,301

(22) PCT Filed: Jan. 6, 2021

(86) PCT No.: PCT/JP2021/000227
§ 371 (c)(1),
(2) Date: Jun. 16, 2022

(87) PCT Pub. No.: WO2021/141050
PCT Pub. Date: Jul. 15, 2021

(65) Prior Publication Data
US 2023/0047775 A1     Feb. 16, 2023

(30) Foreign Application Priority Data

Jan. 8, 2020    (JP) ................................ 2020-001286

(51) Int. Cl.
*B25J 9/16*     (2006.01)
*G05B 19/4093*  (2006.01)
*G05B 19/42*    (2006.01)

(52) U.S. Cl.
CPC ........ *B25J 9/1664* (2013.01); *G05B 19/4093* (2013.01); *G05B 19/42* (2013.01)

(58) Field of Classification Search
CPC ... B25J 9/1664; B25J 9/1671; G05B 19/4093; G05B 19/42; G05B 2219/40121;
(Continued)

(56) References Cited

U.S. PATENT DOCUMENTS 8,788,081 B2 *   7/2014  Nagatsuka ............. G06F 30/20
                                                        703/2
11,132,479 B1 *  9/2021  Tyson, II ......... G05B 19/41805
(Continued)

FOREIGN PATENT DOCUMENTS

CN      102331718 A    1/2012
CN      103454971 A    12/2013
(Continued)

OTHER PUBLICATIONS

WO-2016009120-A1 Translation (Year: 2016).*
(Continued)

*Primary Examiner* — Kyle T Johnson
(74) *Attorney, Agent, or Firm* — Studebaker & Brackett PC

(57) ABSTRACT

A robot programming device 1 is provided with a model layout unit 112 that lays out a workpiece model of a workpiece, a robot model of a robot, and a tool model of a tool in the virtual space, a machining site designation unit 113 that designates a machining site on the workpiece model, a stereoscopic shape layout unit 115 that lays out a predetermined stereoscopic shape such that a surface of the stereoscopic shape is filled in with a predetermined operation pattern and that the operation pattern is projected to at least one surface of the workpiece model, a machining path creation unit 116 that projects the operation pattern to at least one surface of the workpiece model to create a machining path for the tool, and a change unit 117 that changes the machining path and/or an operation program on the basis of the machining site.

8 Claims, 14 Drawing Sheets

(58) Field of Classification Search
CPC ........... G05B 2219/45013; G05B 2219/45065; Y02P 90/02
See application file for complete search history.

(56) References Cited

U.S. PATENT DOCUMENTS

| | | | | |
|---|---|---|---|---|
| 2010/0114350 | A1* | 5/2010 | Kanai | G05B 19/4097 700/98 |
| 2013/0325177 | A1* | 12/2013 | Atohira | B25J 9/1664 700/245 |
| 2015/0153724 | A1* | 6/2015 | Platt | G06Q 30/0621 700/98 |
| 2015/0209960 | A1* | 7/2015 | Li | G06F 30/20 700/250 |
| 2015/0290795 | A1* | 10/2015 | Oleynik | A47J 36/321 700/257 |
| 2017/0160724 | A1* | 6/2017 | Kikata | B23Q 1/0045 |
| 2018/0150058 | A1* | 5/2018 | Shapiro | G06T 7/40 |
| 2018/0250822 | A1* | 9/2018 | Shimodaira | B25J 9/1697 |
| 2019/0093373 | A1* | 3/2019 | Telleria | B05B 12/18 |
| 2019/0255551 | A1* | 8/2019 | Hargadon | B25J 9/1664 |
| 2019/0291277 | A1* | 9/2019 | Oleynik | B25J 9/1669 |
| 2020/0134860 | A1* | 4/2020 | Haven | G06T 7/0004 |
| 2021/0170593 | A1* | 6/2021 | Yoneyama | B05B 13/0431 |
| 2022/0288774 | A1* | 9/2022 | Gong | B25J 9/1664 |
| 2023/0047775 | A1* | 2/2023 | Yoneyama | G05B 19/42 |

FOREIGN PATENT DOCUMENTS

| | | | | |
|---|---|---|---|---|
| CN | 116125909 | A | * | 5/2023 |
| JP | H08-229863 | A | | 9/1996 |
| JP | H09-244722 | A | | 9/1997 |
| JP | 2001-060108 | A | | 3/2001 |
| JP | 4870831 | B2 | | 2/2012 |
| JP | 5340455 | B1 | | 11/2013 |
| JP | 2016-101644 | A | | 6/2016 |
| WO | WO-2016009120 | A1 | * | 1/2016 ............ B25J 9/1671 |

OTHER PUBLICATIONS

CN-116125909-A translation (Year: 2023).*
International Search Report issued in PCT/JP2021/000227; mailed Feb. 22, 2021.

* cited by examiner ent unit that arranges a predetermined three-dimensional shape in the virtual space so that a predetermined movement pattern fills in a face of the three-dimensional shape and is projected onto at least one face of the workpiece model; a processing route creation unit that creates a processing route for the tool by projecting the movement pattern on at least one face of the workpiece model; and a changer that changes the processing route and/or the operation program based on the target region.

ROBOT PROGRAMMING DEVICE

TECHNICAL FIELD

The present invention relates to a robot programming device.

BACKGROUND ART

In order for a robot to process a workpiece with an equipped tool, the robot needs to be taught how to move in advance. For example, Patent Documents 1 and 2 disclose a programming device that teaches a program for a robot equipped with a tool for processing a workpiece placed in a workspace.

Patent Document 1: Japanese Patent No. 5340455

Patent Document 2: Japanese Patent No. 4870831

DISCLOSURE OF THE INVENTION

Problems to be Solved by the Invention

When such a programming device creates, for example, a program for coating work based on a movement pattern, an operator needs to manually correct the shape of the movement pattern to teach the robot to avoid a masked region and shorten the cycle time. This teaching work requires many man-hours. Thus, it has been desired to reduce the man-hours required for teaching work in robot programming devices.

Means for Solving the Problems

An aspect of the present disclosure is directed to a robot programming device that teaches an operation program for a robot equipped with a tool for processing a workpiece placed in a workspace. The robot programming device includes: a virtual space creation unit that creates a virtual space representing the workspace three-dimensionally; a model arrangement unit that arranges a workpiece model representing the workpiece, a robot model representing the robot, and a tool model representing the tool the virtual space; a target region specification unit that specifies a target region of the workpiece; a three-dimensional shape arrangement unit that arranges a predetermined three-dimensional shape in the virtual space so that a predetermined movement pattern fills in a face of the three-dimensional shape and is projected onto at least one face of the workpiece model; a processing route creation unit that creates a processing route for the tool by projecting the movement pattern on at least one face of the workpiece model; and a changer that changes the processing route and/or the operation program based on the target region.

Effects of the Invention

The present invention can reduce man-hours required for teaching work.

PREFERRED MODE FOR CARRYING OUT THE INVENTION

Figure 1:
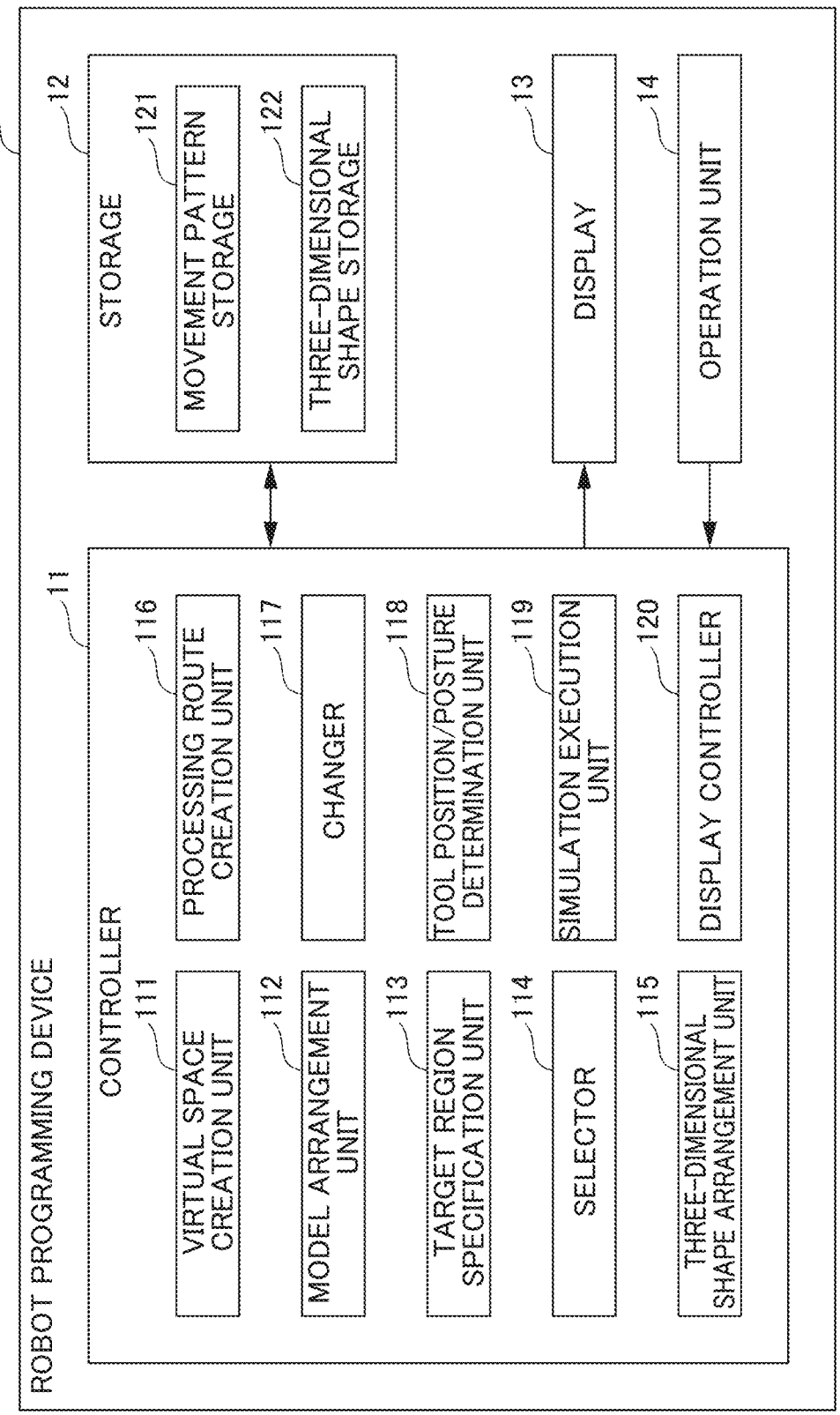
FIG. 1 is a block diagram illustrating a configuration of a robot programming device according to an embodiment.

Embodiments of the present invention will be described below. FIG. 1 is a block diagram illustrating a configuration of a robot programming device according to the present embodiment. As shown in FIG. 1, a robot programming device 1 includes a controller 11, a storage 12, a display 13, and an operation unit 14. The robot programming device 1 is intended to teach an operation program for a robot equipped with a tool for processing a workpiece placed in a workspace.

The controller 11 is a processor such as a central processing unit (CPU), and achieves various functions by executing programs stored in the storage 23. The controller 11 includes a virtual space creation unit 111, a model arrangement unit 112, a target region specification unit 113, a selector 114, a three-dimensional shape arrangement unit 115, a processing route creation unit 116, a changer 117, a tool position/ posture determination unit 118, a simulation execution unit 119, and a display controller 120.

The virtual space creation unit 111 creates a virtual space representing the workspace three-dimensionally. The model arrangement unit 112 arranges a workpiece model representing a workpiece, a robot, model representing a robot, and a tool model representing a tool in the virtual space.

The target region specification unit 113 specifies a target region to be processed of the workpiece model. The selector 114 makes a selection from movement patterns stored in a movement pattern storage 121. The selector 114 also makes a selection from three-dimensional shapes stored in a three-dimensional shape storage 122.

The three-dimensional shape arrangement unit 115 arranges a predetermined three-dimensional shape in the virtual space so that a predetermined movement pattern fills in a face of the three-dimensional shape and is projected onto at least one face of the workpiece model.

The processing route creation unit 116 creates a processing route for the tool by projecting the movement pattern on at least one face of the workpiece model. The changer 117 changes the processing route and/or the operation program based on the target region.

The tool position/posture determination unit 118 automatically determines the position or position and posture of the tool model based on the processing route created by the processing route creation unit 116 and a normal direction to at least one face of the workpece model.

For example, when the tool model is a sprayer model representing a sprayer having at least one nozzle, the simulation execution unit 119 uses a robot model equipped with the sprayer model to run a simulation of coating work for coating the workpiece model with a material sprayed from the nozzle in accordance with the operation program while moving the sprayer model.

The display controller 120 allows the display 13 to show images of the virtual space, the workpiece model, the robot model, and the tool model. For example, when the tool model is a sprayer model representing a sprayer having at least one nozzle, the display controller 120 allows the display 13 to show the target region of the workpiece model in different colors depending on time for coating the target region with the material sprayed from the nozzle.

The storage 12 is a storage device, such as a read only memory (ROM) that stores an operating system (OS) and application programs, a random-access memory (RAM), and a hard disk drive and a solid-state drive (SSD) that store various types of information.

The storage 12 includes a movement pattern storage 121 and a three-dimensional shape storage 122. The movement pattern storage 121 stores plural types of movement patterns, each of which is a continuous trajectory indicating the movement of the tool. The three-dimensional shape storage 122 stores three-dimensional shapes, such as a three-dimensional shape including a plurality of continuous planes and a three-dimensional shape including a curved surface.

The display 13 is comprised of a liquid crystal display (LCD), a cathode ray tube (CRT), or any other suitable device, and displays various types of images. The operation unit 14 is comprised of a mouse, a keyboard, or any other suitable device, and receives various types of inputs.

How the robot programming device of the present embodiment teaches a robot operation program will be described in detail below. FIGS. 2 to 5 are views illustrating a workpiece model, a robot model, and a tool model in a virtual space.

Figure 2:
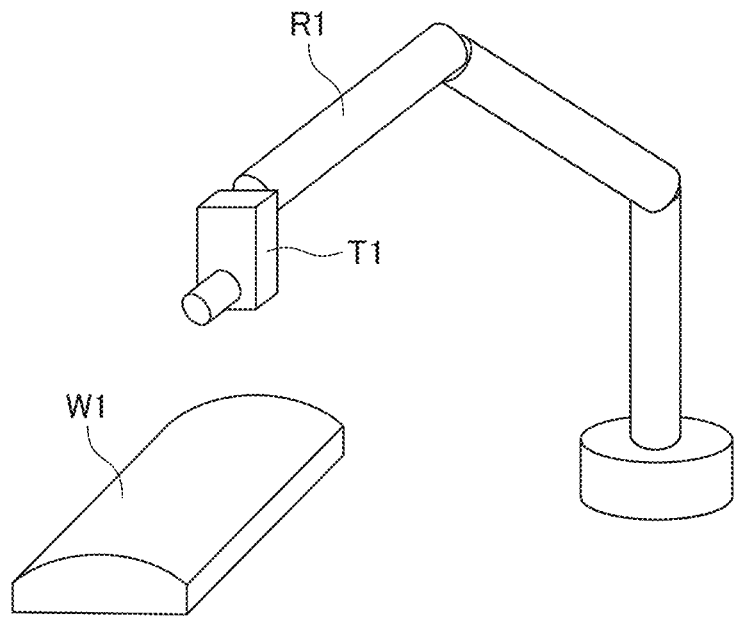
FIG. 2 is a view illustrating a workpiece model, a robot model, and a tool model is a virtual space.
Figure 3:
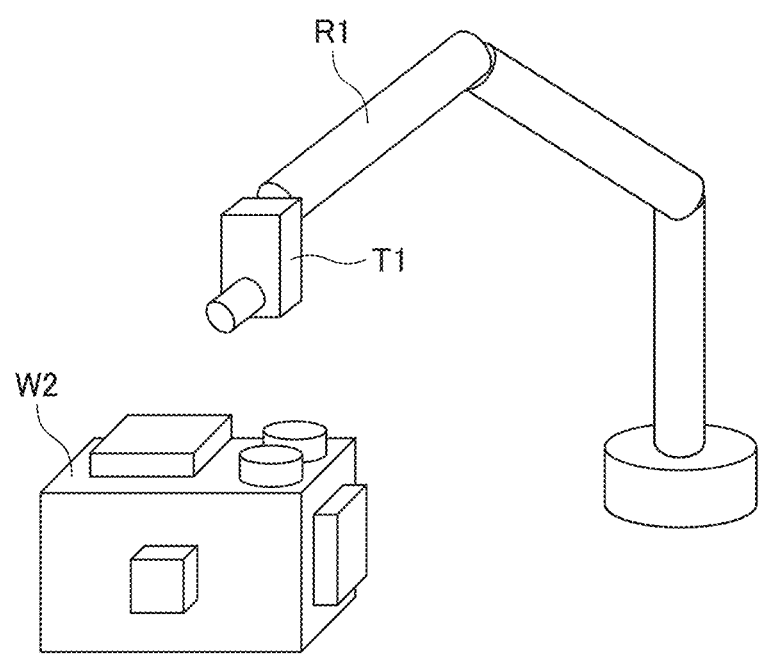
FIG. 3 is a view illustrating a workpiece model, a robot model, and a tool model in a virtual space.

In the examples shown in FIGS. 2 and 3, a tool model T1 is a sprayer model representing a sprayer having at least one nozzle. As shown in FIG. 2, the virtual space creation unit 111 creates a virtual space representing a workspace three-dimensionally, and the model arrangement unit 112 arranges a workpiece model W1 representing a workpiece, a robot model R1 representing a robot, and a tool model T1 representing a tool in the virtual space.

In the example shown in FIG. 3, the model arrangement unit 112 arranges a workpiece model W2 representing a workpiece, the robot model R1 representing the robot, and the tool model T1 representing the tool in the virtual space. The workpiece model W2 is different in shape from the workpiece model W1.

Figure 4:
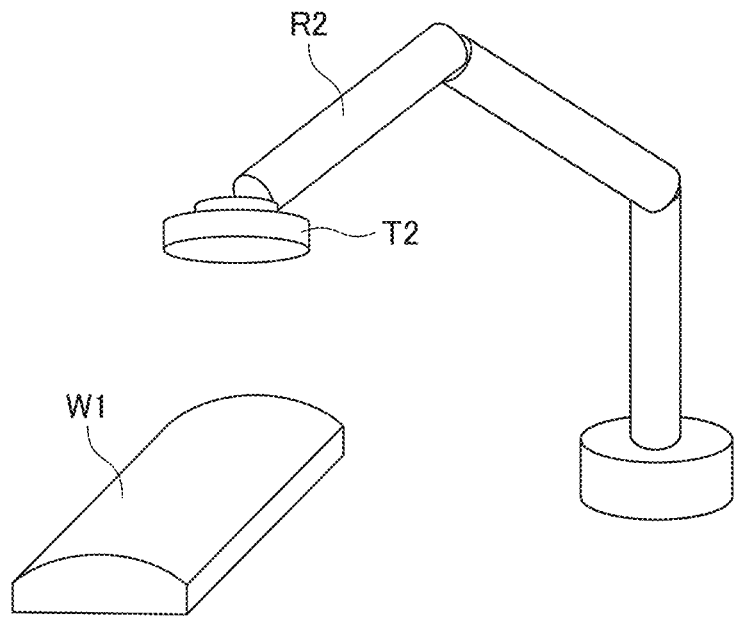
FIG. 4 is a view illustrating a workpiece model, a robot model, and a tool model in a virtual space.
Figure 5:
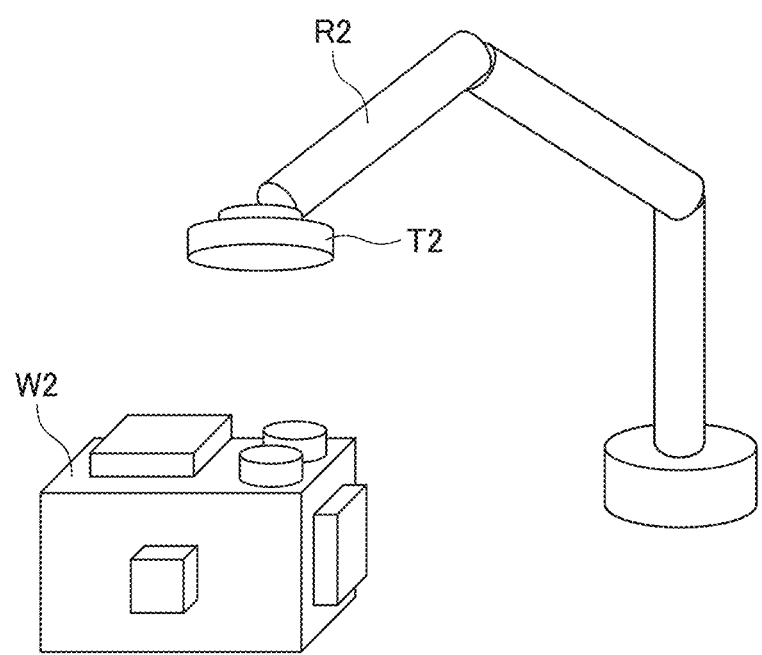
FIG. 5 is a view illustrating a workpiece model, a robot model, and a tool model in a virtual space.

In the examples shown in FIGS. 4 and 5, a tool model T2 is a polisher model having a polishing tool. In the example shown in FIG. 4, the model arrangement unit 112 arranges the workpiece model W1 representing the workpiece, the robot model R1 representing the robot, and the tool model T2 representing the tool in the virtual space. In the example shown in FIG. 5, the model arrangement unit 112 arranges the workpiece model W2 representing the workpiece, the robot model R1 representing the robot, and the tool model T2 representing the tool in the virtual space.

Figure 6A:
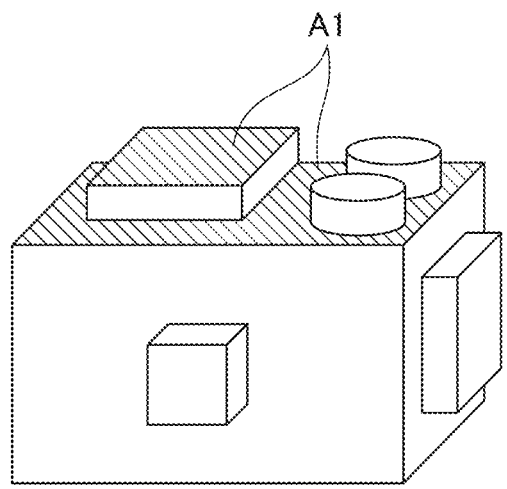
FIG. 6A is a view illustrating a specified target region of a workpiece model.

FIGS. 6A to 6D are views each illustrating a specified target region and/or non-target region of the workpiece model. FIG. 6A is a view illustrating a specified target region of the workpiece model. As shown in FIG. 6A, The target region specification unit 113 specifies at least one face A1 of the target region of the workpiece model W2 based on the entry via the operation unit 14.

Figure 6B:
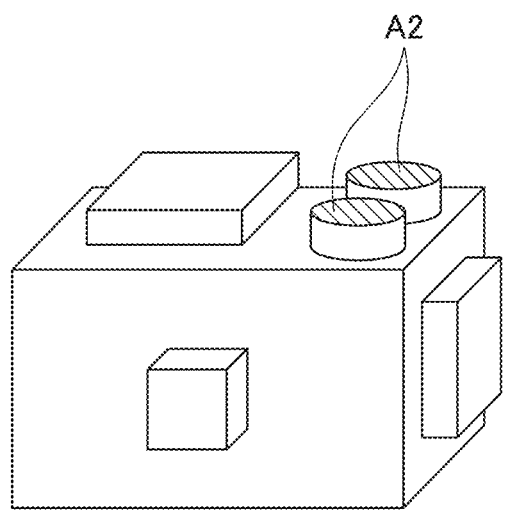
FIG. 6B is a view illustrating a specified non-target region of the workplace model.

FIG. 6B is a view illustrating a specified non-target region of the workpiece model. As shown in FIG. 6B, the target region specification unit 113 specifies at least one face A2 of the non-target region of the workpiece model W2 based on the entry via the operation unit 14.

Figure 6C:
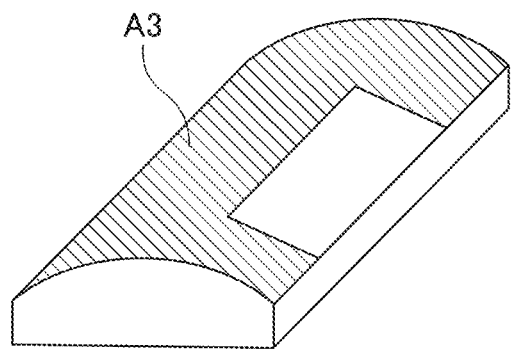
FIG. 6C is a view illustrating a specified non-target region of a workpiece model.

FIG. 6C is a view illustrating a specified target region of the workpiece model. As shown in FIG. 6C, the target region specification unit 113 specifies any area A3 in the target region of the workpiece model W1 based on the entry via the operation unit 14. In the example of FIG. 6C, the target region specification unit 113 specifies the area A3 by encircling the area with a shape such as a square or a circle, or filling in the area freehand.

Figure 6D:
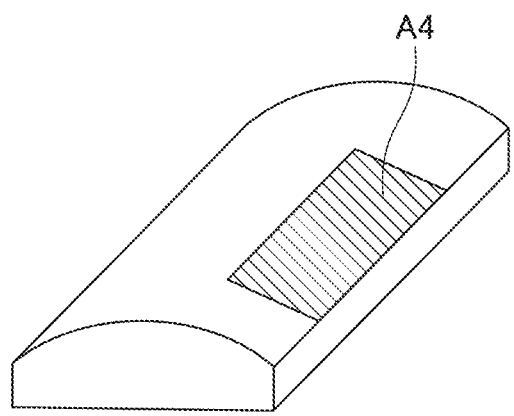
FIG. 6D is a view illustrating a specified non-target region of the workpiece model.

FIG. 6D is a view illustrating a specified non-target region of the workpiece model. As shown in FIG. 6D, the target region specification unit 113 specifies any area A4 in the non-target region of the workpiece model W1 based on the entry via the operation unit 14. In the example of FIG. 6D, the target region specification unit 113 specifies the area A4 by encircling the area with a shape such as a square or a circle, or filling in the area freehand.

Figure 7:
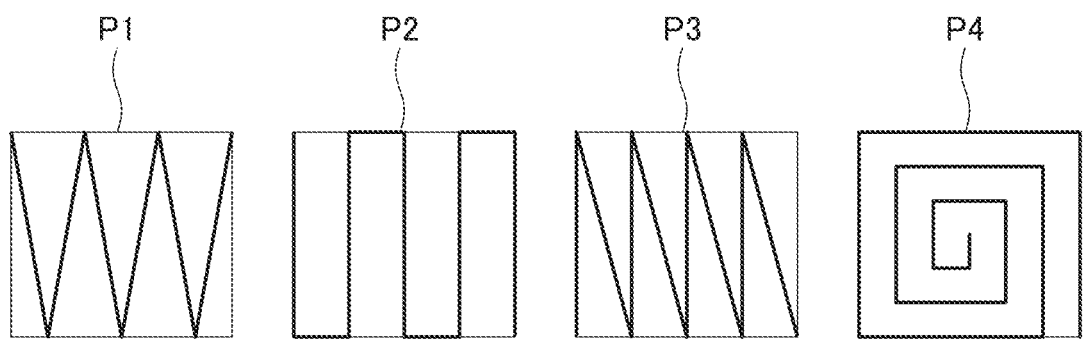
FIG. 7 is a view illustrating examples of movement patterns.

FIG. 7 shows examples of the movement patterns. As shown in FIG. 7, the movement pattern storage 121 stores plural types of movement patterns (e.g., movement patterns P1 to P4). The selector 114 selects one movement pattern from the plural types of movement patterns stored in the movement pattern storage 121.

If the processing needs to be performed twice or more, the selector 114 may select two or more movement patterns. The movement pattern storage 121 may store different movement patterns depending on the type of processing, such as the coating and the polishing.

Figure 8:
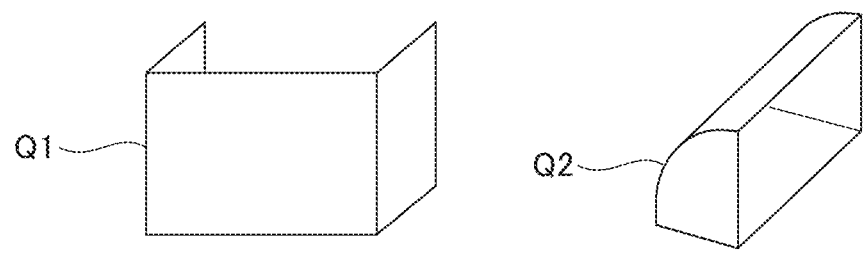
FIG. 8 is a view illustrating examples of three-dimensional shapes.

FIG. 8 shows examples of the three-dimensional shapes. As shown in FIG. 8, the three-dimensional shape storage 122 stores plural types of three-dimensional shapes (e.g., three-dimensional shapes Q1 and Q2). The selector 114 selects one three-dimensional shape from the plural types of three-dimensional shapes stored in the three-dimensional shape storage 122. The selector 114 may select the three-dimensional shape based on the shape of the workpiece model. The three-dimensional shape storage 122 may store different three-dimensional shapes depending on the type of processing, such as the coating and the polishing.

Figure 9:
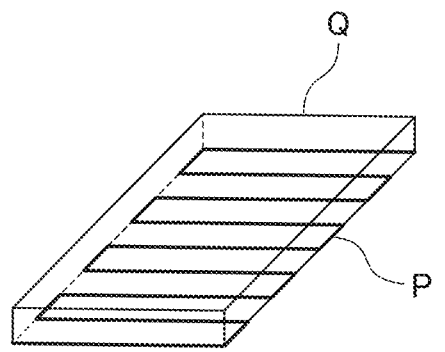
FIG. 9 is a view illustrating an example of how the three-dimensional shape is arranged in the virtual space.

FIG. 9 shows an example of how the three-dimensional shape is arranged in the virtual space. As shown in FIG. 9, the three-dimensional shape arrangement unit 115 arranges a selected predetermined three-dimensional shape Q in the virtual space so that a predetermined movement pattern P fills in a face of the three-dimensional shape Q. The three-dimensional shape arrangement unit 115 arranges the three-dimensional shape Q in the virtual space so that the movement pattern P is projected onto at least one face of the workpiece model W1.

Figure 10:
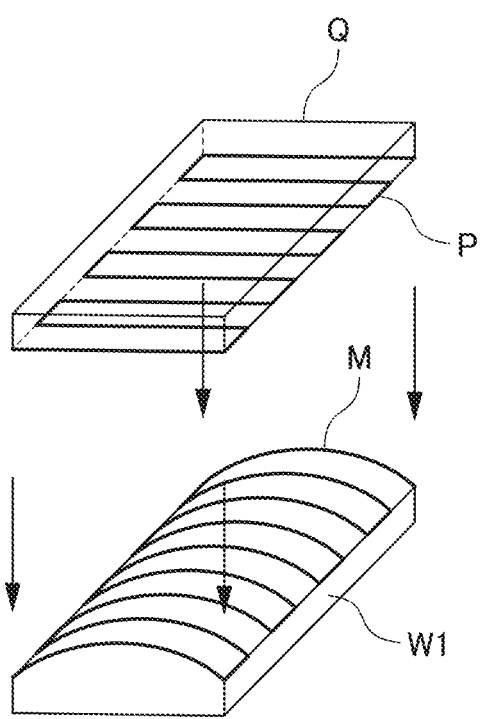
FIG. 10 is a view illustrating an example of how a processing route for a tool is created.

FIG. 10 is a view illustrating an example of how the processing route of the tool is created. As shown in FIG. 10, the processing route creation unit 116 creates a processing route M for the tool by projecting the movement pattern P onto at least one face of the workpece model W1.

Figure 11:
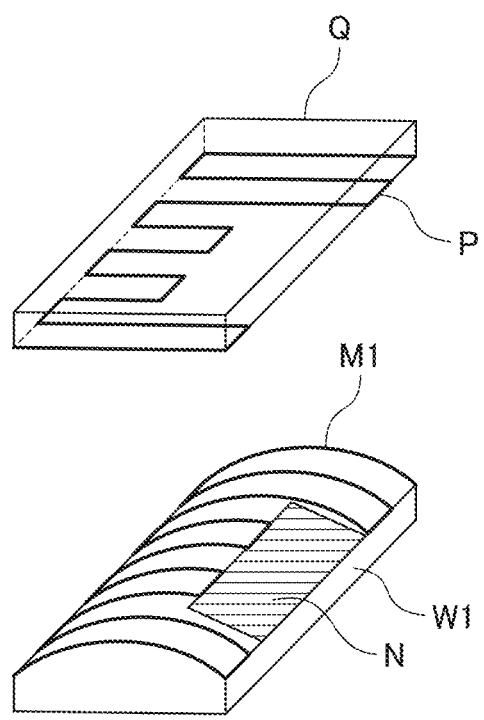
FIG. 11 is a view illustrating an example of how the processing route is changed.
Figure 11:
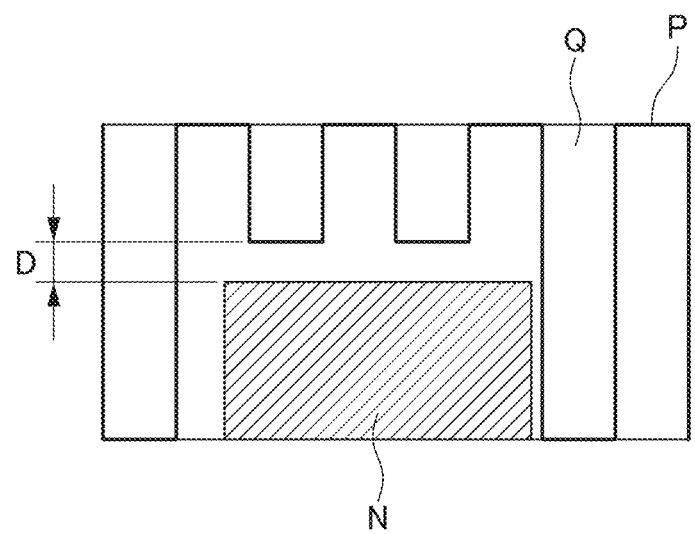

FIG. 11 is a view illustrating an example of how the processing route is changed. As shown in FIG. 11, the changer 117 changes the processing route N to a processing route M1 based on the target region. For example, in the example of FIG. 11, the changer 117 changes the shape of the movement pattern P to avoid a non-target region N. The changer 117 can specify an offset distance D from the non-target region N to the movement pattern P.

Figure 12:
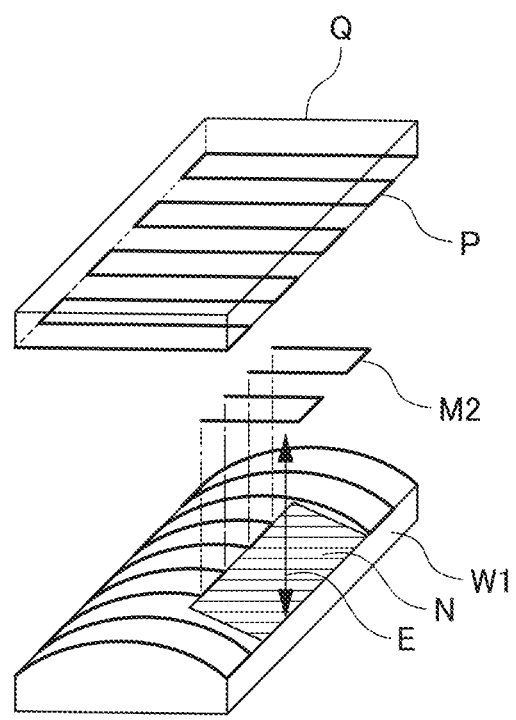
FIG. 12 is a view illustrating an example of how the processing route and an operation program are changed.

FIG. 12 is a view illustrating an example of how the processing route and the operation program are changed. As shown in FIG. 12, the changer 117 may change a processing route M2, which is part of the processing route, and change the operation program so that the tool model moves upward of the non-target region N. The changer 117 can specify an offset distance E from the non-target region N to the movement pattern P.

Figure 13:
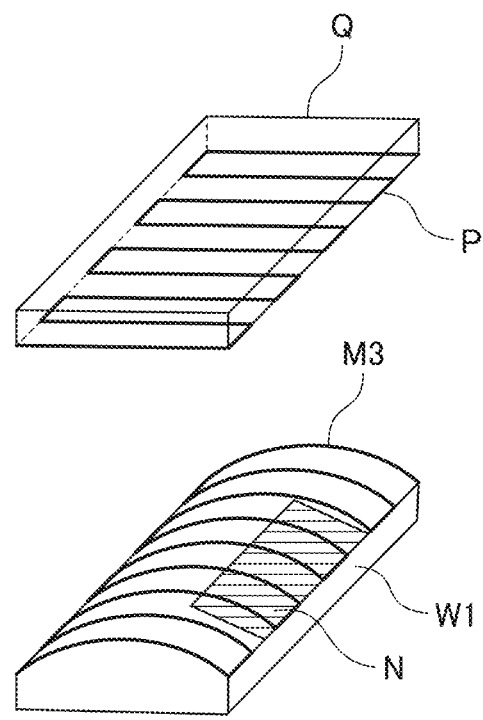
FIG. 13 is a view illustrating an example of how the operation program is changed.
Figure 13:
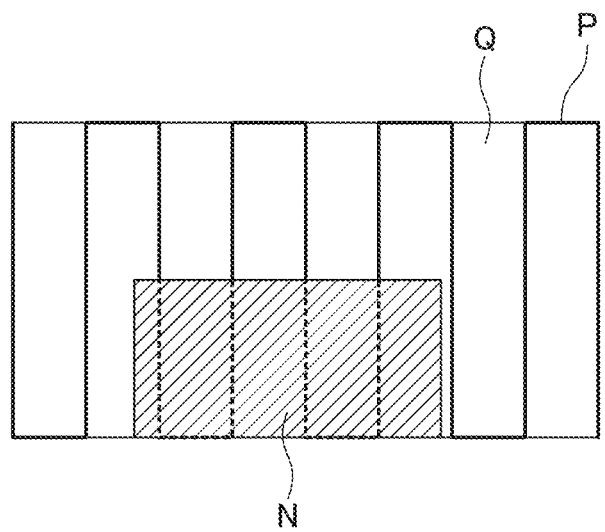

FIG. 13 is a view illustrating an example of how the operation program is changed. As shown in FIG. 13, when an operation program for the coating work is created from the movement pattern P, the changer 117 changes an operation program for outputting and stopping the material, and changes an operation parameter of a processing route M3 not to coat the non-target region N.

Figure 14:
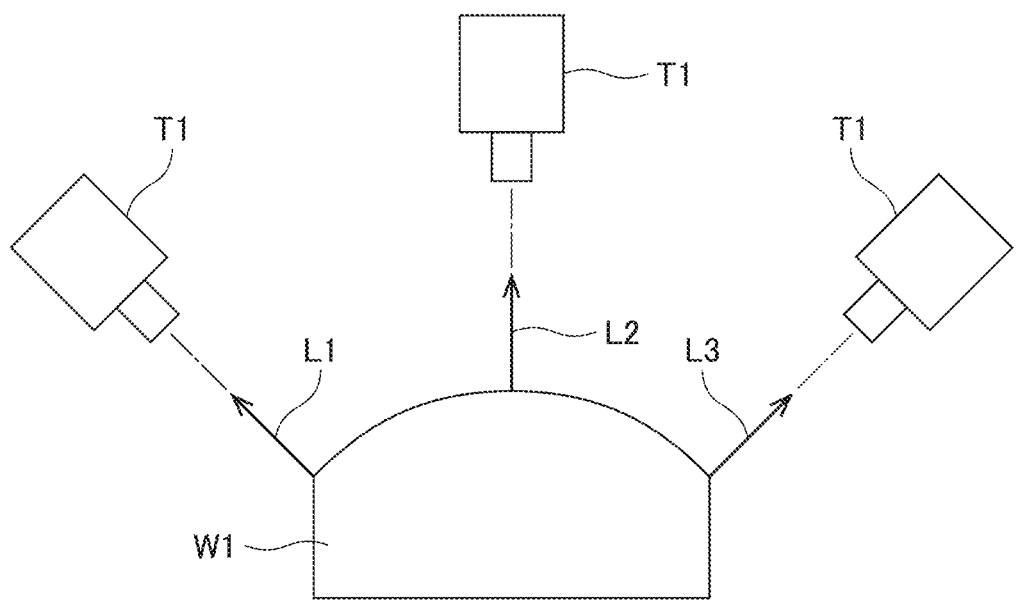
FIG. 14 is a view illustrating an example of coating work using a sprayer model.
Figure 15:
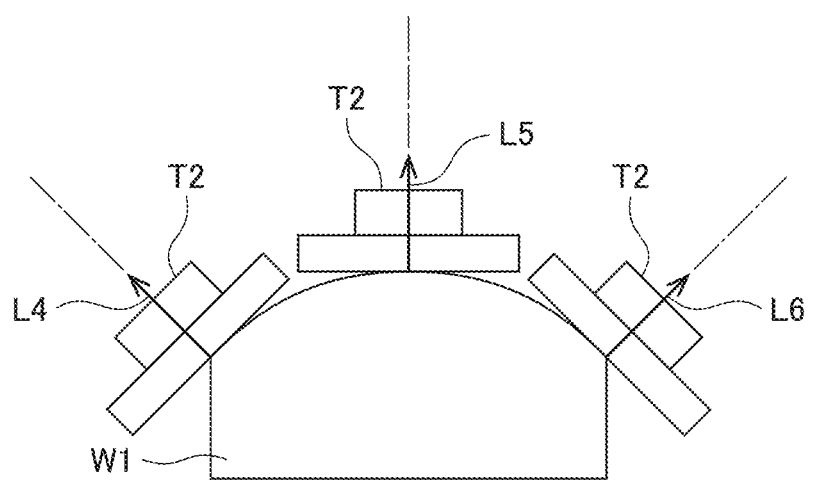
FIG. 15 is a view illustrating an example of polishing work using a polisher model.

FIG. 14 is a view illustrating an example of coating work using a sprayer model. FIG. 15 is a view illustrating an example of polishing work using a polisher model. In the example shown in FIG. 14, the tool position/posture determination unit 118 automatically determines the position or position and posture of the tool model T1 based on the processing route created by the processing route creation unit 116 and normal directions L1, L2, and L3 to at least one face of the workpiece model W1.

The tool position/posture determination unit 118 automatically determines the position or position and posture of the tool model T1 based on, for example, the processing route and the normal directions L1, L2, and L3, so that a distance from the tool model T1 to the workpiece model W1 is constant and the tool model T1 is at right angles to the face of the workpiece model W1.

In the example shown in FIG. 15, the tool position/posture determination unit 118 automatically determines the position or position and posture of the tool model T2 based on the processing route created by the processing route creation unit 116 and normal directions L4, L5, and L6 to at least one face of the workpiece model W1.

The tool position posture determination unit 118 automatically determines the position or position and posture of the tool model T2 based on, for example, the processing route and the normal directions L4, L5, and L6, so that the tool model T2 is at right angles to the face of the workpiece model W1 and in contact with the face of the workpiece model W1.

Figure 16:
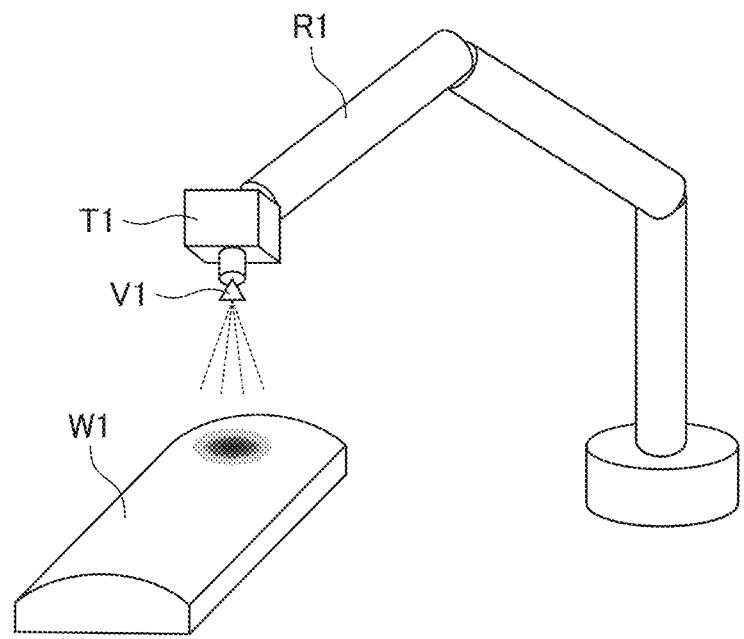
FIG. 16 is a view illustrating an example of a simulation of the coating work.
Figure 17:
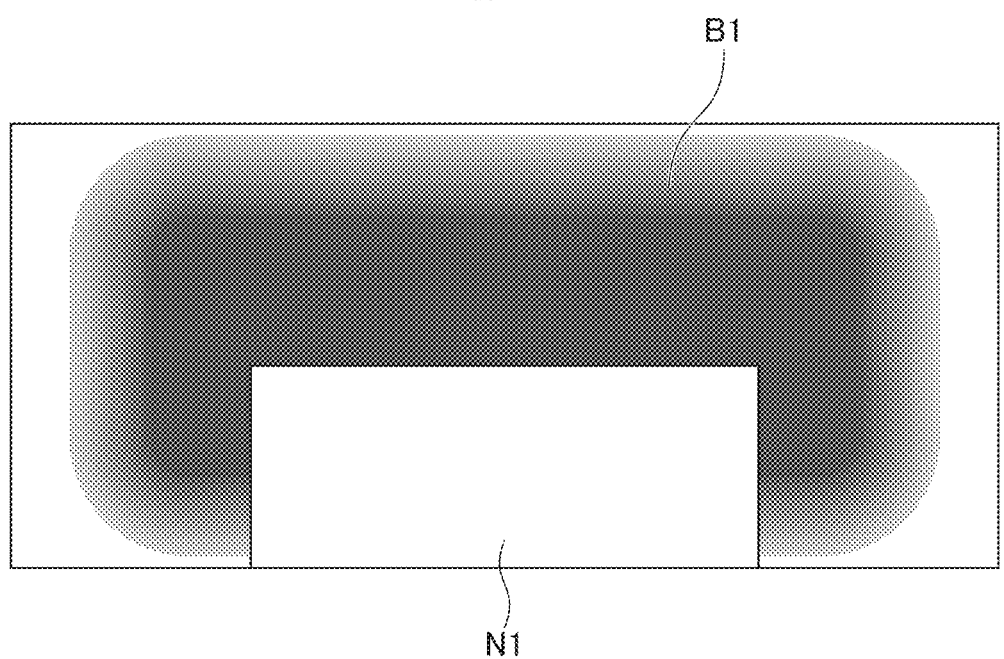
FIG. 17 is a view illustrating an example of a coated workpiece model.
Figure 18:
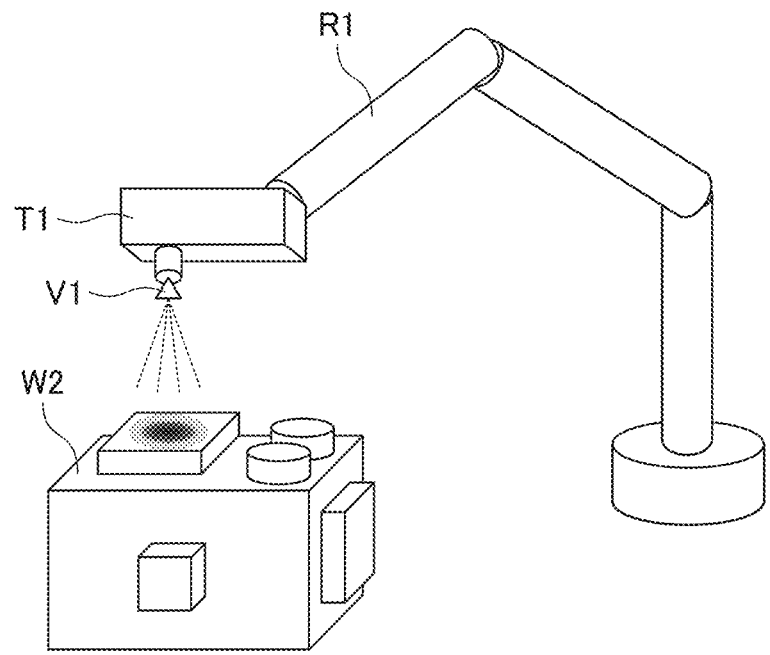
FIG. 18 is a view illustrating an example of a simulation of the coating work.
Figure 19:
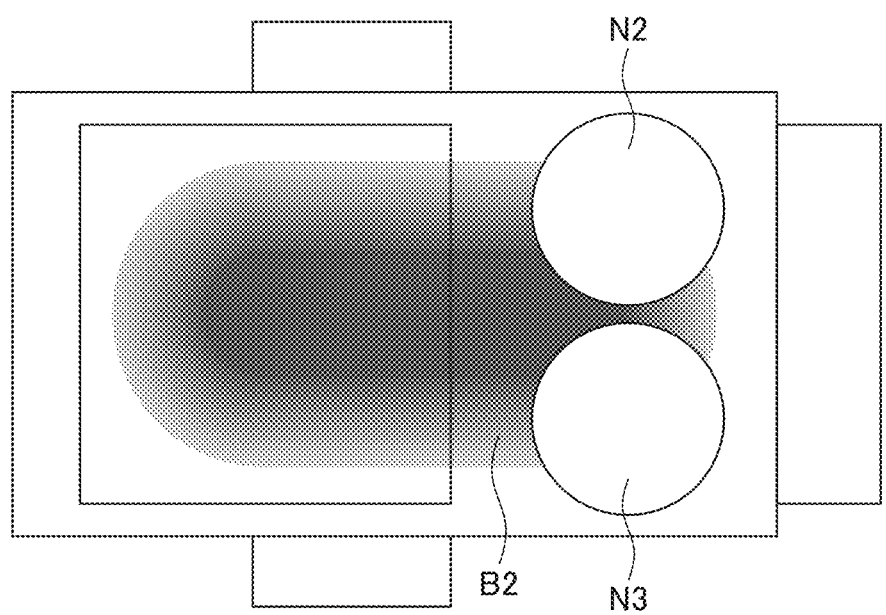
FIG. 19 is a view illustrating an example of a coated workpiece model.

FIGS. 16 and 18 are views illustrating examples of a simulation of the coating work. FIGS. 17 and 19 are views illustrating examples of a coated workpiece model. In the examples shown in FIGS. 16 to 18, the tool model is a sprayer model T1 representing a sprayer having at least one nozzle V1.

In the example shown in FIG. 16, the simulation execution unit 119 uses the robot model R1 equipped with the sprayer model T1 to run a simulation of the coating work for coating the workpiece model W1 with the material sprayed from the nozzle V1 in accordance with the operation program while moving the sprayer model T1.

The display controller 120 allows the display 13 to show the target region of the workpiece model W1 in different colors depending on time for coating the target region with the material sprayed from the nozzle. Specifically, the display controller 120 calculates, for example, points of interference between a three-dimensional model of the shape of the sprayed material and the workpiece model W1 every predetermined time.

Then, the display controller 120 calculates the number of interferences at each of the calculated points of interference on the surface of the workpiece model W1 every predetermined time. The display controller 120 multiplies the calculated number of interferences by the predetermined time to calculate coating time at each point of interference. The display controller 120 displays the target region of the workpiece model W1 in different colors depending on the calculated coating time.

Displaying the target region of the workpiece model W1 in different colors has been known, and is disclosed by, for example, Japanese Patent No. 4870831. Thus, the display controller 120 displays a target region B1 in different colors except a non-target region N1 as shown in FIG. 17.

In the example shown in FIG. 18, the simulation execution unit 119 uses the robot model R1 equipped with the sprayer model T1 to run a simulation of the coating work for coating the workpiece model W2 with the material sprayed from the nozzle V1 in accordance with the operation program while moving the sprayer model T1. As shown in FIG. 19, the display controller 120 displays a target region B2 in different colors except non-target regions N2 and N3.

Figure 20:
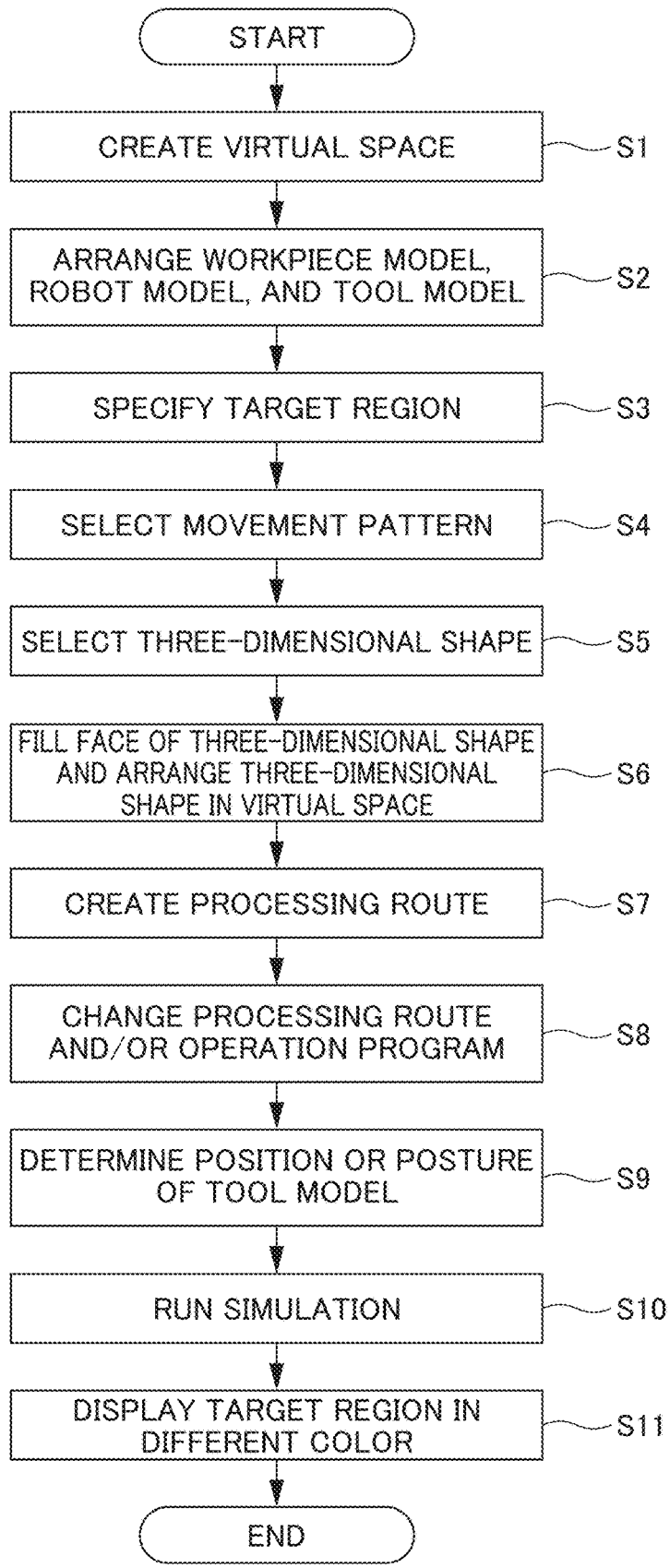
FIG. 20 is a flowchart of the processing of the robot programming device.

FIG. 20 is a flowchart of the processing of the robot programming device. In this example, the tool model is a sprayer model representing a sprayer having at least one nozzle. In step S1, the virtual space creation unit 111 creates a virtual space representing the workspace three-dimensionally. In step S2, the model arrangement unit 112 arranges the workpiece model representing the workpiece, the robot model representing the robot, and the tool model representing the tool in the virtual space.

In step S3, the target region specification unit 113 specifies a target region or non target region of the workpiece model. In step S4, the selector 114 selects one movement pattern from the plural types of movement patterns stored in the movement pattern storage 121.

In step S5, the selector 114 selects one three-dimensional shape from the plural types of three-dimensional shapes stored in the three-dimensional shape storage 122.

In step S6, the three-dimensional shape arrangement unit 115 arranges the predetermined three-dimensional shape in the virtual space so that a predetermined movement pattern fills in a face of the three-dimensional shape and is projected onto at least one face of the workpiece model.

In step S7, the processing route creation unit 116 creates a processing route for the tool by projecting the movement pattern on at least one face of the workpiece model. In step S8, the changer 117 changes the processing route and/or the operation program based on the target region.

In step S9, the tool position/posture determination unit 118 automatically determines the position or position and posture of the tool model based on the processing route created by the processing route creation unit 116 and a normal direction to at least one face of the workpiece model. In step S10, the simulation execution unit 119 uses the robot model equipped with the sprayer model to run a simulation of the coating work for coating the workpiece model with the material sprayed from the nozzle in accordance with the operation program while moving the sprayer model. In step S11, the display controller 120 allows the display 13 to show the target region of the workpiece model in different colors depending on time for coating the target region with the material sprayed from the nozzle.

In the present embodiment, the robot programming device 1 includes: the virtual space creation unit 111 that creates the virtual space representing the workspace three-dimensionally; the model arrangement unit 112 that arranges the workpiece model representing the workpiece, the robot model representing the robot, and the tool model representing the tool in the virtual space; the target region specification unit 113 that specifies the target region of the workpiece; the three-dimensional shape arrangement unit 115 that arranges the predetermined three-dimensional shape in the virtual space so that the predetermined movement pattern fills in the face of the three-dimensional shape and is projected onto at least one face of the workpiece model; the processing route creation unit 116 that creates the processing route for the tool by projecting the movement pattern on at least one face of the workpiece model; and the changer 117 that changes the processing route and/or the operation program based on the target region.

When the operation program for the coating work is created based on the movement pattern, the robot programming device 1 performs masking to coat the workpiece model with the material. In this case, the robot programming device 1 can each the operation program that allows the robot to avoid a masked region to shorten the cycle time. Thus, the robot programming device 1 can reduce man-hours required for the teaching work.

When the operation program for the polishing work is created based on the movement pattern, the robot programming device 1 can teach the operation program that allows the robot to avoid faces other than a target face to be polished of the workpiece model. Thus, the robot programming device 1 can reduce man-hours required for the teaching work.

The target region specification unit 113 specifies at least one face of the target region of the workpiece model or any area in the target region of the workpiece model. Thus, the robot programming device 1 can suitably teach the movement for the coating or polishing work.

The target region specification unit 113 specifies at least one face of the non-target region of the workpiece model or any area in the non-target region of the workpiece model. Thus, the robot programming device 1 can suitably teach the masking or the movement for avoiding faces other than the target face to be polished.

The tool position/posture determination unit 118 automatically determines the position or position and posture of the tool model based on the processing route created by the processing route creation unit 116 and a normal direction to at least one face of the workpiece model. Thus, the robot programming device 1 can suitably teach the position or position and posture of the tool model.

The simulation execution unit 119 uses the robot model equipped with the sprayer model to run a simulation of the coating work for coating the workpiece model with the material sprayed from the nozzle in accordance with the operation program while moving the sprayer model. The display controller 120 allows the display 13 to show the target region of the workpiece model in different colors depending on time for coating the target region with the material sprayed from the nozzle. Thus, the robot programming device 1 can run a simulation of the operation program for the coating work taking the masked region into account.

Embodiments of the present invention have just been described above, but the present invention is not limited to those exemplary embodiments. The advantages described in the embodiments are merely listed as the most suitable advantages derived from the present invention, and do not limit the advantages of the present invention.

EXPLANATION OF REFERENCE NUMERALS

1 Robot programming device
11 Controller
12 Storage
13 Display
14 Operation unit
111 Virtual space creation unit
112 Model arrangement unit
113 Target region specification unit
114 Selector
115 Three-dimensional shape arrangement unit
116 Processing route creation unit
117 Changer
118 Tool position/posture determination unit
119 Simulation execution unit
120 Display controller
121 Movement pattern storage
122 Three-dimensional shape storage

The invention claimed is:

1. A robot programming device that teaches an operation program for a robot equipped with a tool for processing a workpiece placed in a workspace, the robot programming device comprising:
a processor configured to:
create a virtual space representing the workspace three-dimensionally;
arrange a workpiece model representing the workpiece, a robot model representing the robot, and a tool model representing the tool in the virtual space, wherein the tool model is a sprayer model that represents a sprayer having at least one nozzle;
specify a target region and non-target region of the workpiece model;
arrange a predetermined three-dimensional shape in the virtual space so that a predetermined movement pattern fills in a face of the three-dimensional shape and is projected onto at least one face of the workpiece model;
create a processing route for the tool by projecting the movement pattern on at least one face of the workpiece model;
change the processing route and/or the operation program based on the target region;
use the robot model equipped with the sprayer model to run a simulation of coating work for coating the workpiece model with a material sprayed from the nozzle in accordance with the operation program while moving the sprayer model; and allow a display to show the target region of the workpiece model in different colors depending on time for coating the target region with the material sprayed from the nozzle.

2. The robot programming device of claim 1, wherein the processor specifies at least one face in the target region of the workpiece model.

3. The robot programming device of claim 1, wherein the processor specifies at least one face of a non-target region of the workpiece model.

4. The robot programming device of claim 1, wherein the processor specifies any area in the target region of the workpiece model.

5. The robot programming device of claim 1, wherein the processor specifies any area in a non-target region of the workpiece model.

6. The robot programming device of claim 1, wherein the processor specifies an offset distance from the non-target region to the movement pattern, and changes the shape of the movement pattern to avoid a non-target region.

7. The robot programming device of claim 1, wherein the processor specifies an offset distance from the non-target region to the movement pattern, and changes the operation program so that the tool model moves upward of the non-target region.

8. The robot programming device of claim 1, wherein the processor changes the operation program for outputting and stopping the material, when the operation program for the coating work is created from the movement pattern, and changes an operation program for outputting and stopping the material, and changes an operation parameter of a processing route not to coat the non-target region.

* * * * *